3,306,712
EXTRACTION OF LITHIUM HALIDES FROM CALCIUM-CONTAINING BRINES IN THE PRESENCE OF UREA AND ALCOHOL-KETONE
Robert D. Goodenough and Remigius A. Gaska, Midland, Mich., assignors to The Dow Chemical Company, Midland, Mich., a corporation of Delaware
No Drawing. Filed Dec. 30, 1963, Ser. No. 334,604
5 Claims. (Cl. 23—312)

This invention relates to the recovery of lithium values from brines containing both lithium salts and calcium salts in solution and, more particularly, is concerned with a process for recovering lithium values from lithium and calcium-containing brines by the addition of a complexing agent thereto and the subsequent solvent extraction of the lithium values therefrom by use of an organic solvent.

Lithium metal and lithium salts are finding increasing use in industrial operations, for example, in alloys for heat transfer purposes or in various salt forms in electrolytic processes. Formerly, a principal source therefor was largely such ores as spodumene, lepidolite and amblygonite which, after preliminary beneficiation, were treated with sulfuric acid to obtain the lithium values.

Lithium may also be obtained from brines containing lithium salts. One of the ways of obtaining lithium values from lithium-containing brines is to extract the lithium salts therefrom by employing certain aliphatic alcohols. Such an extraction technique is successful in separating the lithium values from certain other salts there present, e.g., potassium and sodium salts, but has been quite unsatisfactory in separating the lithium values from calcium salts present therein. The persistence of the calcium salts in the lithium compounds so separated has been a serious objection to the extraction technique for the separation of lithium values from brine. Accordingly, a need existed for a more effective method to attain this end.

It is a principal object of the instant invention to provide an improved method of preferentially recovering lithium values from brines containing both lithium salts and calcium salts.

Other uses, objects and advantages of the method of the instant invention will become apparent from reading the detailed description disclosed hereinafter.

We have unexpectedly discovered a novel method for recovering lithium values from lithium-containing source materials which comprises admixing an aliphatic monohydroxy alcohol containing from 3 to 6 carbon atoms per molecule or an aliphatic ketone containing from 4 to 7 carbon atoms per molecule with a brine which contains both lithium salts and calcium salts, e.g., calcium chloride, introducing, during or subsequent to the alcohol-brine mixing step, a complexing agent which is miscible with the brine solution containing the lithium salts and calcium salts, the complexing agent being further characterized in that it forms a complex with the calcium salts in the brine, which complex is soluble in the resulting mixture thereby to preferentially extract the lithium values into the organic phase. An example of a particularly suitable complexing agent is urea.

Following the extraction, agitation is stopped. As the alcohol or ketone extract and the brine mixture become quiescent, stratification into two layers occurs, the lighter organic phase contains a substantial portion of the lithium salts present and the heavier aqueous phase contains a substantial portion of the calcium present. Thereafter, the organic phase is separated from the aqueous phase and the lithium value recovered therefrom.

In practicing the invention, the volumetric ratio of the alcohol or the ketone to the brine is not critical and may be anywhere between about 0.5 and about 10. A ratio by volume of the alcohol or ketone to the brine of between about 1 and 3 is commonly employed.

The complexing agent may be introduced either as a solid or liquid. It is employed in a mole ratio of complexing agent to calcium salts present in the brine in the range of from about 0.5 to about 2.5 to provide a concentration of the complexing agent between from about 10 to about 40 percent based on the weight of the brine present.

For most efficient operation, the ketone or alcohol and the brine mixture must be kept in a state of agitation in the presence of the complexing agent to a sufficient extent to maintain the mixture in a state of equilibrium. The temperature is not highly critical and may be anywhere between 0° and 70° C., a temperature between 20° and 30° being commonly employed.

The extraction time to be employed is such that the alcohol or ketone extracts an appreciable portion of the lithium salts from the brine while maintaining the mixture in a state of agitation which is sufficient to insure substantial homogeneity.

The active length of time employed for a particular extraction operation is dependent upon the ratio of alcohol or ketone to the brine employed, upon the adequacy of the stirring provided and upon the sufficiency of the supply of complexing agent provided. Preferably, enough time for the extraction operation should be employed so that the alcohol or ketone becomes substantially saturated with the lithium salts present.

Best results are obtained by repeating the extraction operation a number of times employing fresh alcohol or ketone. The number of times the extraction operation is repeated is dependent upon the distribution coefficient of the system, the concentration of the solute and solvent and the economics involved since each successive extraction operation will be carried out on a brine containing less and less of the lithium values. This is best accomplished in a column where brine in which urea is dissolved therein is contacted with alcohol in a countercurrent action.

The lithium values in the alcohol or ketone may be removed therefrom, if desired, by contacting the alcohol or ketone, preferably by countercurrent flow, with fresh water and thereafter separating the lithium values from water. Such a process is well understood in the solvent extraction art and is usually referred to as stripping. The lithium values may be recovered as the salt from either water or the organic solvent as by evaporation. It is often desirable, however, to use the lithium salts in the dissolved state.

After stripping the lithium from the organic phase, the latter can be reused again as the extracting solvent. The brine effluent and the water-strip solution can be combined and stripped free of the complexing agent.

Examples of suitable aliphatic monoalcohols include, but are not limited to, n-butanol, amyl alcohol, isoamyl alcohol and isopropyl alcohol. Aliphatic ketones suitable for use herein include, but are not limited to, methyl ethyl ketone and methyl isobutyl ketone.

The brine may be any brine which contains sufficient lithium to make the treatment thereof, for the purpose of recovering the lithium, economically feasible. It is preferable that the brine be substantially free of magnesium. If not, the magnesium may be removed from the brine prior to treatment in accordance with the instant method by admixing therewith an alkali metal or alkaline earth hydroxide which will cause the magnesium values to precipitate as magnesium hydroxide and may thereafter be separated by such means as filtration. However, the magnesium need not be removed for the practice of the instant invention.

The lithium salts that can be present in the brine so that the brine is suitable for use in the instant method include lithium chloride, lithium bromide, lithium iodide and mixtures thereof.

The natural brines which are most commonly employed in the practice of the invention usually have an apparent pH value within the range of from about 5 to about 7 and are fully satisfactory without pH adjustment. When such brines have been first treated with an alkali metal or an alkaline earth hydroxide to precipitate out magnesium there present in the form of magnesium hydroxide, it is recommended that the pH be adjusted downward to less than 7 by the admixture therewith of a suitable agent, e.g., hydrochloric acid, before the addition of urea. The term "apparent pH" is construed to mean a pH meter value as measured by a glass electrode-standard calomel electrode, said value being affected by the electrolyte concentration.

Any suitable apparatus provided with a vessel and a mixing device operating therein and from which the desired phase may be successively removed may be employed to carry out the invention.

The following example is illustrative of the method of the instant invention but in no way is meant to limit it thereto.

Example

Two separate runs were made employing a brine having a specific gravity of 1.39 and the following analysis by weight:

41.9 weight percent $CaCl_2$
0.024 weight percent LiCl
Balance substantially water In the first test (hereinafter referred to as Run No. 1), about 50 milliliters of the brine was placed in a vessel provided with a stirring mechanism. About 100 milliliters of n-butanol was added to the brine in the vessel. Thereafter, about 23.2 grams of urea was introduced into said vessel. The temperature was maintained at about 25° C. for a period of about 2 hours while agitating the mixture. At the end of this period, agitation was discontinued, both phases sampled while still in contact with urea and the samples analyzed for the calcium and lithium content.

A comparative run was made employing the same procedure as described above except that no urea was used.

The results of this study are set out in Table 1 and show the following: (1) the weight of calcium or of lithium present in each phase in grams per liter, (2) the ratio of lithium in the organic phase to that in the aqueous phase (lithium distribution ratio), (3) the ratio of calcium in the organic phase to that in the aqueous phase (calcium distribution ratio), (4) the preference of lithium over calcium shown by the organic phase to that shown by the aqueous phase as expressed by the selectivity of the ratio of (2) to (3), i.e.

$$\frac{\text{ratio of lithium in the organic phase to that in the aqueous phase}}{\text{ratio of calcium in the organic phase to that in the aqueous phase}}$$

and (5) the percentage of lithium and calcium based on the total of lithium plus calcium ultimately recovered from the organic phase.

TABLE 1

| | (1) | | | | (2) | (3) | (4) | (5) | |
|---|---|---|---|---|---|---|---|---|---|
| | Organic Phase | | Aqueous Phase | | Lithium Distribution Ratio [1] | Calcium Distribution Ratio [2] | Selectivity,[3] Li Distribution Ratio / Ca Distribution Ratio | Percent Recovery From Brine,[4] Approx. | |
| | Li, g./l. | Ca, g./l. | Li, g./l. | Ca, g./l. | | | | Li | Ca |
| Run No. 1 (using urea) | 0.019 | 9.0 | 0.015 | 150 | 1.27 | 0.06 | 21.2 | 69 | 8.6 |
| Comparative run (no urea) | 0.024 | 24.0 | 0.025 | 200 | 0.96 | 0.12 | 8.0 | 85 | 22 |

[1] Li in the organic phase / Li in the aqueous phase.

[2] Ca in the organic phase / Ca in the aqueous phase.

[3] Ratio of Li in the organic phase to that in the aqueous phase / Ratio of Ca in the organic phase to that in the aqueous phase.

[4] Based on weight of total of Li and Ca ultimately recovered from the organic phase.

Reference to the results of Run No. 1 and the comparative run as set out in Table 1 show that, in the presence of urea, there is a marked reduction in the amount of calcium values extracted in the organic phase as compared to the results in the comparative run.

In a manner similar to the foregoing, other aliphatic monoalcohols containing from 3 to 6 carbon atoms per molecule or aliphatic ketones containing from 4 to 7 carbon atoms per molecule and other complexing agents which contain an oxygen with a pair of unshared electrons can be used to give comparable results.

Various modifications can be made in the method of the instant invention without departing from the spirit or scope thereof, for it is to be understood that we limit ourselves only as defined in the appended claims.

What is claimed is:

1. The process of recovering lithium values from an aqueous brine containing lithium salts, selected from the group consisting of lithium chloride, lithium bromide, lithium iodide and mixtures thereof, and other salts dissolved therein including calcium salts, which comprises:
   (a) admixing with said brine an organic solvent selected from the group consisting of aliphatic monoalcohols containing from 3 to 6 carbon atoms per molecule and aliphatic ketones containing from 4 to 7 carbon atoms per molecule in a ratio of the organic solvent to the brine within the range of from about 0.5 to about 10 by volume in the presence of urea, said urea being provided in a mole ratio with calcium salts present in the brine within the range of from about 0.5 to about 2.5 and being between from about 10 and about 40 weight percent of the weight of the brine;
   (b) agitating the mixture at a temperature within the range of from about 0° to about 70° C. for a period of time sufficient such that the organic solvent extracts a substantial portion of the lithium values from the brine;
   (c) stopping said agitation and separating said mixture into a lighter organic phase containing a substantial portion of the lithium values and a heavier aqueous phase containing a substantial portion of the calcium values; and
   (d) separating the organic phase from the aqueous phase.

2. The process according to claim 1 wherein the preferred ratio by volume of organic solvent to brine is within the range of from about 1 to about 3.

3. The process according to claim 1 wherein the temperature is within the range of from about 20° to about 30° C.

4. The process according to claim 1 wherein said admixture of brine, organic solvent and urea is continually agitated until the organic solvent is substantially saturated with lithium salts extracted from the brine.

5. The process of recovering lithium values from a brine containing lithium chloride and calcium chloride dissolved therein, which comprises:
  (a) admixing with said brine n-butanol in a ratio of the n-butanol to the brine being within the range of from about 0.5 to about 10 by volume, in the presence of urea, the amount of said urea providing a mole ratio of urea to said calcium chloride present in the brine of about 0.5 to about 2.5 and within the range of from about 10 to about 40 percent of the weight of the brine;
  (b) agitating the mixture at a temperature within the range of from about 0° to about 70° C. for a period of time sufficient such that the n-butanol extracts a substantial portion of the lithium values from the brine;
  (c) stopping said agitation and separating said mixture into a lighter organic phase containing a substantial portion of the lithium values and a heavier aqueous phase containing a substantial portion of the calcium values;
  (d) separating the organic phase from the aqueous phase; and
  (e) recovering the lithium values from the organic phase.

References Cited by the Examiner

UNITED STATES PATENTS

| | | | |
|---|---|---|---|
| 2,726,138 | 12/1955 | Cunningham | 23—89 X |
| 3,219,422 | 11/1965 | Ellis | 23—312 |
| 3,241,929 | 3/1966 | Jordan | 23—312 |

FOREIGN PATENTS 1,159,415  12/1963  Germany.

NORMAN YUDKOFF, *Primary Examiner.*

S. EMERY, *Assistant Examiner.*